US012560429B2

(12) United States Patent
    Isoya

(10) Patent No.: US 12,560,429 B2
(45) Date of Patent: Feb. 24, 2026

(54) STRAIN AMOUNT DETECTING DEVICE

(71) Applicant: Hitachi Astemo, Ltd., Hitachinaka (JP)

(72) Inventor: Yuki Isoya, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 384 days.

(21) Appl. No.: 18/031,281

(22) PCT Filed: Sep. 10, 2021

(86) PCT No.: PCT/JP2021/033299
    § 371 (c)(1),
    (2) Date: Apr. 11, 2023

(87) PCT Pub. No.: WO2022/172497
    PCT Pub. Date: Aug. 18, 2022

(65) Prior Publication Data
    US 2023/0375340 A1      Nov. 23, 2023

(30) Foreign Application Priority Data

Feb. 9, 2021    (JP) ................................. 2021-019076

(51) Int. Cl.
    *G01B 21/32*        (2006.01)
(52) U.S. Cl.
    CPC .................................... *G01B 21/32* (2013.01)
(58) Field of Classification Search
    CPC .................................. G01B 21/32; G01B 7/18
    See application file for complete search history.

(56) References Cited

U.S. PATENT DOCUMENTS

| | | | |
|---|---|---|---|
| 2016/0229236 A1 | 8/2016 | Taki | |
| 2017/0174015 A1 | 6/2017 | McKellar et al. | |
| 2020/0023693 A1* | 1/2020 | Ochi ..................... | B60C 23/135 |

(Continued)

FOREIGN PATENT DOCUMENTS

| | | | | |
|---|---|---|---|---|
| AU | 2017206696 | * | 7/2018 | ............. H02K 11/40 |
| CN | 106965631 | * | 7/2017 | ......... B60C 23/0488 |
| CN | 106965631 A | | 7/2017 | |

(Continued)

OTHER PUBLICATIONS

Chinese Office Action issued on Sep. 26, 2025 for Chinese Patent Application No. 202180069273.X.

*Primary Examiner* — Alexander Satanovsky
(74) *Attorney, Agent, or Firm* — Volpe Koenig

(57)        ABSTRACT

An object of the present invention is to provide a strain amount detecting device capable of reducing power consumption by determining a timing of measuring strain and a timing of transmitting a result of the measurement by itself. A strain amount detecting device according to the present invention includes a state determination unit that determines an operation state of an object according to a feature amount of a change with time of a measurement signal. The strain amount detecting device acquires the measurement signal at a first sampling rate and computes the strain amount when the object is in a stopped state, and acquires the measurement signal at a second sampling rate higher in frequency than the first sampling rate and computes the strain amount when the object is in a transitional state in which the object transitions from the stopped state to a moving state (see FIG. 1).

7 Claims, 4 Drawing Sheets

(56)     References Cited

U.S. PATENT DOCUMENTS

2021/0178841 A1* 6/2021 Garbelli ................. B60C 23/06

FOREIGN PATENT DOCUMENTS

| | | | | | |
|---|---|---|---|---|---|
| JP | 2003-252014 | A | 9/2003 | | |
| JP | 2007-168671 | A | 7/2007 | | |
| JP | 2013-67244 | A | 4/2013 | | |
| JP | 2016-37233 | A | 3/2016 | | |
| JP | 2016037233 | * | 3/2016 | ............ | B60C 23/04 |
| JP | 2016-144961 | A | 8/2016 | | |
| JP | 2020-200012 | A | 12/2020 | | |

* cited by examiner

STRAIN AMOUNT DETECTING DEVICE

TECHNICAL FIELD

The present invention relates to a strain amount detecting device that detects a strain amount of an object.

BACKGROUND ART

Tire strain sensors can be used for detecting slips or the like of vehicles by detecting deformation of tires. Since tire strain sensors are mounted on inner surfaces of tires, batteries are usually used as power sources. In order to continue the detection operation, it can be said that it is desirable for strain sensors to continue to operate at least for a period of time equal to or longer than the replacement cycle of the tires.

Conventional tire strain sensors constantly measure strain and transmit results of the measurement regardless of the travel state (for example, traveling, stopping, starting, or the like) of vehicles. Accordingly, power is consumed even in a situation where it is less necessary to measure strain of tires, such as when vehicles are stopping, for example. Therefore, the operating time of the sensors tends to be short.

PTL 1 below describes a technique for reducing battery consumption of a sensor attached to a wheel. This literature, an object of which is "to provide a vehicle controller capable of suppressing consumption of a battery of a sensor means attached to a wheel and detecting pneumatic pressure and acceleration", describes a technique of "a vehicle controller provided with a sensor means 4 attached to each wheel 2, detecting pneumatic pressure of the wheel and acceleration applied to the wheel, and transmitting a signal related to the pneumatic pressure and a signal related to acceleration applied to the wheel to a vehicle body side, a transmission and reception means 6, 20 provided on the vehicle body side, determining transmission situation including transmission contents from the sensor means and transmission rate to transmit it to the sensor means, and receiving the signals from the sensor means, a pneumatic pressure alarm device 22 judging pneumatic pressure of each wheel based on the signal related to the pneumatic pressure to issue an alarm when pneumatic pressure of any wheel is deviated from a predetermined range, and a control characteristic change means 30 for changing control characteristic of a vehicle based on the signal related to the acceleration" (see Abstract).

PTL 2 below describes a technique for reducing battery consumption of a sensor attached to a wheel. This literature, an object of which is "it should be enabled to transmit tire-pressure information also on a spare wheel to a tire-pressure notification device, while suppressing battery consumption", describes a technique of "a transmission controller of a sensor unit causes wheel information to be periodically transmitted, when an acceleration Gx detected by an acceleration sensor is larger than a running-judgment threshold value 5G (S13 to S16). The transmission controller accumulates a point P set up according to the acceleration Gx in a predetermined period when the acceleration Gx is not more than the running-judgment threshold value 5G (S18 to S24), and causes the wheel information to be transmitted when an accumulated value of the point P accumulated in the predetermined time is larger than a running-track-record-judgment threshold value 10 (S25 to S28)" (see Abstract).

CITATION LIST

Patent Literature

PTL 1: JP 2003-252014 A
PTL 2: JP 2016-144961 A

SUMMARY OF INVENTION

Technical Problem

The technique described in PTL 1 relates to a vehicle controller. That is, the technique in this literature is established by instructing the operation frequency of a sensor from a vehicle controller to the sensor. Therefore, in an environment where such an instruction cannot be obtained from the vehicle controller, it is difficult to extend the operating time of the sensor. In other words, if the sensor itself can determine the operation frequency, it is considered that the operating time can be extended without obtaining such an instruction from the outside of the sensor.

The technique in PTL 2 determines the frequency of transmitting the wheel information by using the acceleration Gx detected by the acceleration sensor. Therefore, an acceleration sensor is required separately from a strain sensor, or communication with an existing acceleration sensor is required. In this case, it is necessary to separately design a communication interface between the strain sensor and the acceleration sensor, which increases a design cost and a processing load. If the strain sensor itself can determine the operation frequency, it is considered that such a load can be reduced.

The present invention has been made in view of the above problems, and an object of the present invention is to provide a strain amount detecting device capable of reducing power consumption by determining a timing of measuring strain and a timing of transmitting a result of the measurement by itself.

Solution to Problem

A strain amount detecting device according to the present invention includes a state determination unit that determines an operation state of an object according to a feature amount of a change with time of a measurement signal. The strain amount detecting device acquires the measurement signal at a first sampling rate and computes the strain amount when the object is in a stopped state, and acquires the measurement signal at a second sampling rate higher in frequency than the first sampling rate and computes the strain amount when the object is in a transitional state in which the object transitions from the stopped state to a moving state.

Advantageous Effects of Invention

According to the strain amount detecting device of the present invention, the strain amount detecting device itself determines a timing of measuring strain and a timing of transmitting a result of the measurement. As a result, it is possible to reduce power consumption without acquiring an instruction or a measurement result from an external system or an external sensor.

DESCRIPTION OF EMBODIMENTS

First Embodiment

Figure 1:
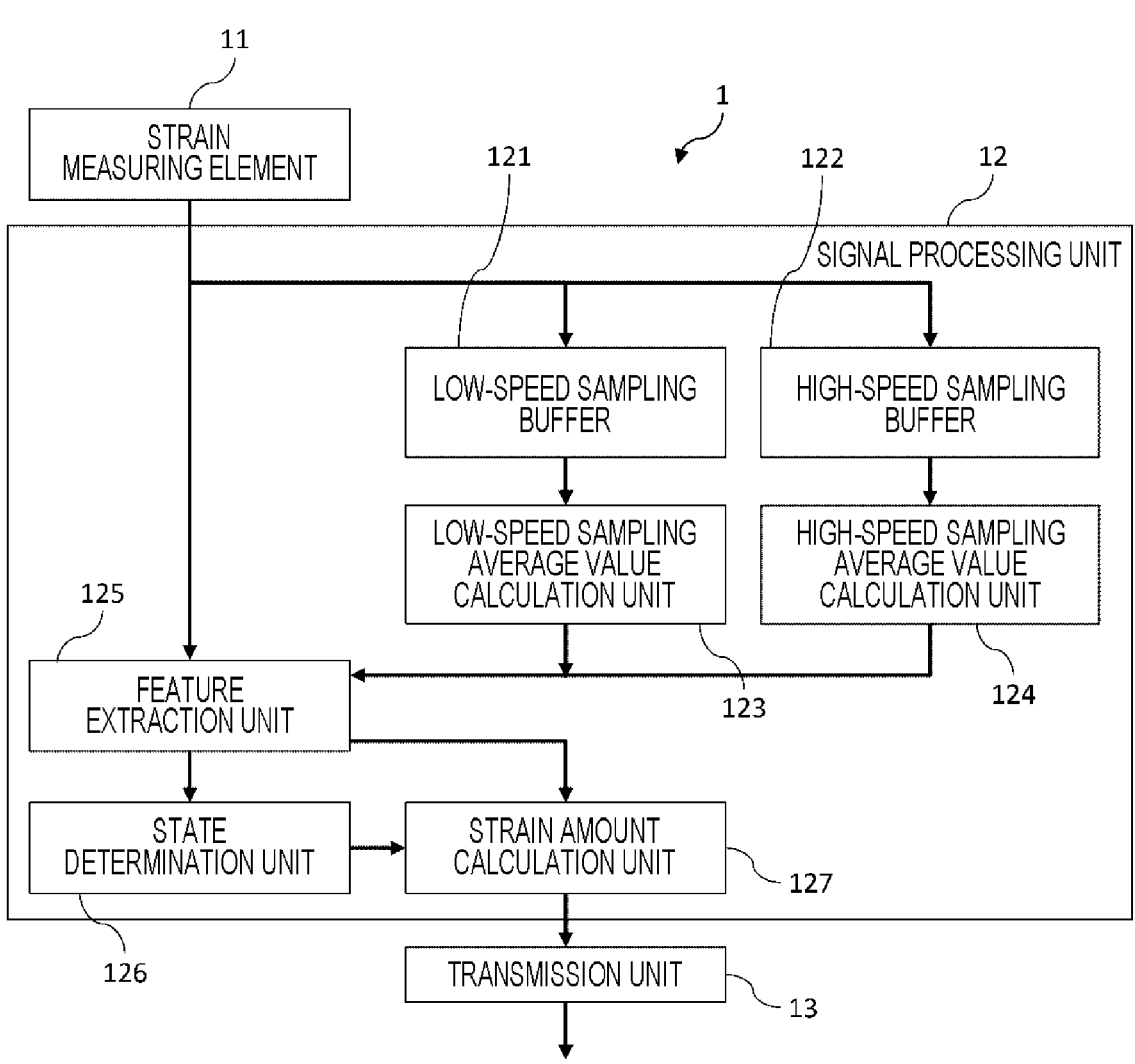
FIG. 1 is a block diagram illustrating a configuration of a strain amount detecting device 1 according to a first embodiment.

FIG. 1 is a block diagram illustrating a configuration of a strain amount detecting device 1 according to a first embodiment of the present invention. The strain amount detecting device 1 is a device that detects a strain amount of an object. For example, a deformation amount of a tire can be detected by attaching the strain amount detecting device 1 on an inner surface of a tire. The strain amount detecting device 1 includes a strain measuring element 11, a signal processing unit 12, and a transmission unit 13. The signal processing unit 12 further includes a low-speed sampling buffer 121, a high-speed sampling buffer 122, a low-speed sampling aver- age value calculation unit 123, a high-speed sampling aver- age value calculation unit 124, a feature extraction unit 125, a state determination unit 126, a strain amount calculation unit 127.

The strain measuring element 11 is an element that detects strain of an object (for example, a tire) to which the strain amount detecting device 1 is attached. The strain measuring element 11 converts a strain amount into an electric signal by utilizing a fact that electric resistance changes due to strain of a strain generation body, for example. The strain mea- suring element 11 outputs a measurement signal indicating a measurement result to the low-speed sampling buffer 121, the high-speed sampling buffer 122, and the feature extrac- tion unit 125. Whether to use the low-speed sampling buffer 121 or the high-speed sampling buffer 122 will be described later.

The signal processing unit 12 can switch between a low-speed sampling mode and a high-speed sampling mode. During operation in the low-speed sampling mode, a mea- surement signal is sampled at a low sampling period, and the frequency of calculating a strain amount is also low corre- sponding to the sampling period. During operation in the high-speed sampling mode, a measurement signal is sampled with high frequency as compared with the low- speed sampling mode, and the frequency of calculating a strain amount is also high corresponding to the sampling period. The sampling period in the high-speed sampling mode is, for example, an integral multiple of the sampling period in the low-speed sampling mode.

The low-speed sampling buffer 121 and the high-speed sampling buffer 122 each record the measurement signal over a predetermined period of time. The low-speed sam- pling buffer 121 records the measurement signal during operation in the low-speed sampling mode. The high-speed sampling buffer 122 records the measurement signal during operation in the high-speed sampling mode.

In some cases, sampling timings during operation in the high-speed sampling mode overlap with sampling timings in the low-speed sampling mode. At this time, both the low- speed sampling buffer 121 and the high-speed sampling buffer 122 may record the measurement signal. As a result, both the low-speed sampling period and the high-speed sampling period can be used as a reference sampling timing when the state determination unit 126, which will be described later, determines the operation state of an object. This operation is assumed below.

The low-speed sampling average value calculation unit 123 computes a time average of the measurement signal stored in the low-speed sampling buffer 121. The computa- tion frequency is synchronized with the low-speed sampling period. The high-speed sampling average value calculation unit 124 computes a time average of the measurement signal stored in the high-speed sampling buffer 122. The compu- tation frequency is synchronized with the high-speed sam- pling period. The low-speed sampling buffer 121 further records the measurement signal at timings overlapping with those of the low-speed sampling period among timings in the high-speed sampling mode. The low-speed sampling average value calculation unit 123 computes the time aver- age of the measurement signal stored in the low-speed sampling buffer 121 at timings overlapping with those of the low-speed sampling period among timings in the high-speed sampling mode.

The feature extraction unit 125 computes a feature amount of the measurement signal by comparing the time average of the measurement signal with a current value of the measurement signal output from the strain measuring element 11. The time average of the measurement signal serves as a judgment criterion. A specific example of a computation procedure will be described later.

The state determination unit 126 judges the operation state of an object according to the feature amount computed by the feature extraction unit 125. The operation state referred to herein is, for example, in a case in which a strain amount of a tire is detected, an operation state (for example, stopping, starting, traveling, and the like) of a vehicle on which the tire is mounted. The determination criterion will be described later together with an example of the feature amount.

The strain amount calculation unit 127 computes a strain amount of an object by using a measurement signal output from the strain measuring element 11. The timing of com- puting the strain amount is synchronized with the timing of sampling the measurement signal. That is, the strain amount is computed with low frequency during low-speed sampling, and the strain amount is computed with high frequency during high-speed sampling.

The transmission unit 13 transmits the strain amount computed by the strain amount calculation unit 127 to the outside of the strain amount detecting device 1. The timing of transmitting the strain amount is synchronized with the timing of sampling the measurement signal. That is, the strain amount is transmitted with low frequency during low-speed sampling, and the strain amount is transmitted with high frequency during high-speed sampling. A trans- mission means may be wired or wireless.

Figure 2:
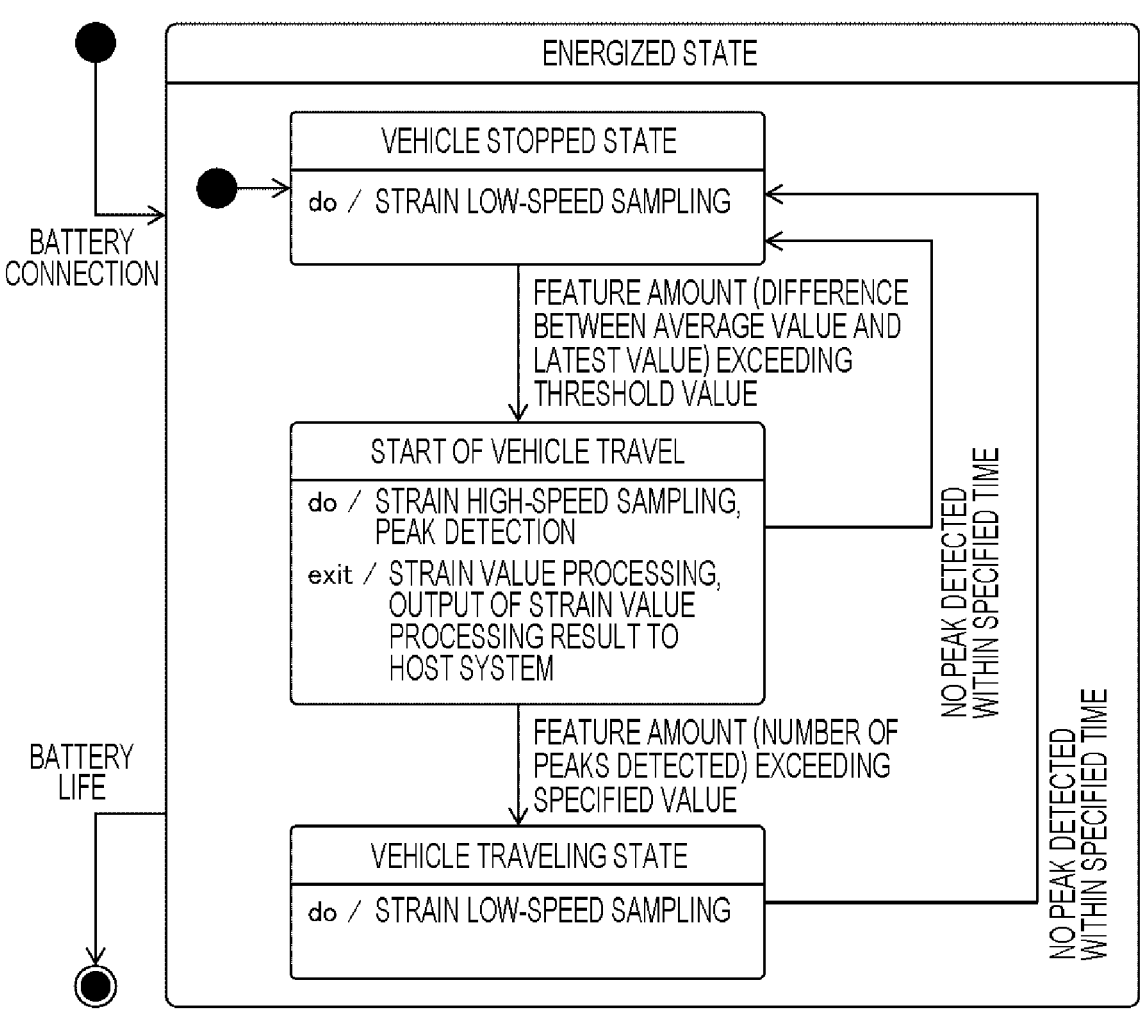
FIG. 2 is a view for describing a state transition of a mode in which a signal processing unit 12 samples a measurement signal.

FIG. 2 is a view for describing a state transition of a mode in which the signal processing unit 12 samples a measure- ment signal. Hereinafter, conditions under which the signal processing unit 12 transitions between the low-speed sam- pling mode and the high-speed sampling mode will be described with reference to FIG. 2. Here, it is assumed that the strain amount detecting device 1 is mounted on a tire of a vehicle.

(FIG. 2: Vehicle Stopped State)

When the strain amount detecting device 1 is powered on, the vehicle is considered to be in a stopped state. Therefore, there is little need to acquire the strain amount of the tire with high frequency. Accordingly, the signal processing unit 12 samples the measurement signal in the low-speed sampling mode in this state.

(FIG. 2: Transition to Start of Vehicle Travel)

When the vehicle starts traveling, (starts), strain is generated in the tire, and the measurement signal starts to fluctuate. The feature extraction unit 125 computes a difference between an average value of the measurement signal stored in the low-speed sampling buffer 121 and the latest measurement signal output from the strain measuring element 11 as a feature amount. The state determination unit 126 determines that the vehicle has started traveling (is in a transitional state between the stopped state and the traveling state) when the difference exceeds a threshold value. For example, when a ratio between a time average value of the measurement signal and the latest value of the measurement signal exceeds the threshold value, the state determination unit 126 can determine that the vehicle has started traveling. A time rate of change in strain amount of a tire is large at the start of travel. Therefore, the signal processing unit 12 samples the measurement signal in the high-speed sampling mode in this state.

(FIG. 2: Transition to Start of Vehicle Travel: Supplement)

If there is an abnormality in the tire when the vehicle starts, it is possible to take a measure such as immediately stopping the vehicle by sending an alert notifying a driver of the abnormality. This increases the safety of the vehicle. In this manner, it can be said that it is highly necessary to acquire the tire strain amount with high frequency when the vehicle starts.

(FIG. 2: Transition to Vehicle Traveling State)

When the vehicle is starting, a plurality of sharply rising peak waveforms occur in the measurement signal. Before and after each peak, an inverse peak waveform occurs in which the measurement signal slightly falls from a steady state. In a case in which the strain amount detecting device 1 is attached to one location of an inner surface of the tire, this peak is caused by strain caused in the vicinity of the attachment location of the strain amount detecting device 1 every time the wheel rotates. The feature extraction unit 125 extracts this peak waveform as a feature amount. The state determination unit 126 determines that the vehicle has transitioned to a traveling state when the peak waveform is detected a specified number of times or more during starting of the vehicle. The signal processing unit samples the measurement signal in the low-speed sampling mode in the traveling state.

(FIG. 2: Transition to Vehicle Traveling State: Supplement)

It is necessary to acquire the strain amount of the tire also in the traveling state. However, from a viewpoint of reducing power consumption, it can be considered that the high-speed sampling mode is used during starting of the vehicle when the necessity is higher, and the sampling priority may be lowered in the traveling state. In view of the above, in the present embodiment, the low-speed sampling mode is used in the traveling state.

(FIG. 2: Transition to Vehicle Stopped State)

The feature extraction unit 125 extracts the above-described peak waveform as a feature amount in each of the traveling start state and the traveling state. In a case in which no peak is detected within a specified time, the state determination unit 126 determines that the vehicle has transitioned to the stopped state, and shifts to the low-speed sampling mode.

(FIG. 2: Transition to Vehicle Stopped State: Supplement)

It is desirable to use the same determination criterion (the measurement signal acquired under the same criterion) both when determining whether or not the state has transitioned from the traveling start state to the stopped state and when determining whether or not the state has transitioned from the traveling state to the stopped state. In view of the above, the feature extraction unit 125 and the state determination unit 126 use the measurement signal stored in the low-speed sampling buffer 121 when performing these determinations. That is, in the traveling start state, (a) the measurement signal stored in the high-speed sampling buffer 122 is used when determining whether or not the state has transitioned to the traveling state, and (b) the measurement signal stored in the low-speed sampling buffer 121 is used when determining whether or not the state has transitioned to the stopped state.

Figure 3:
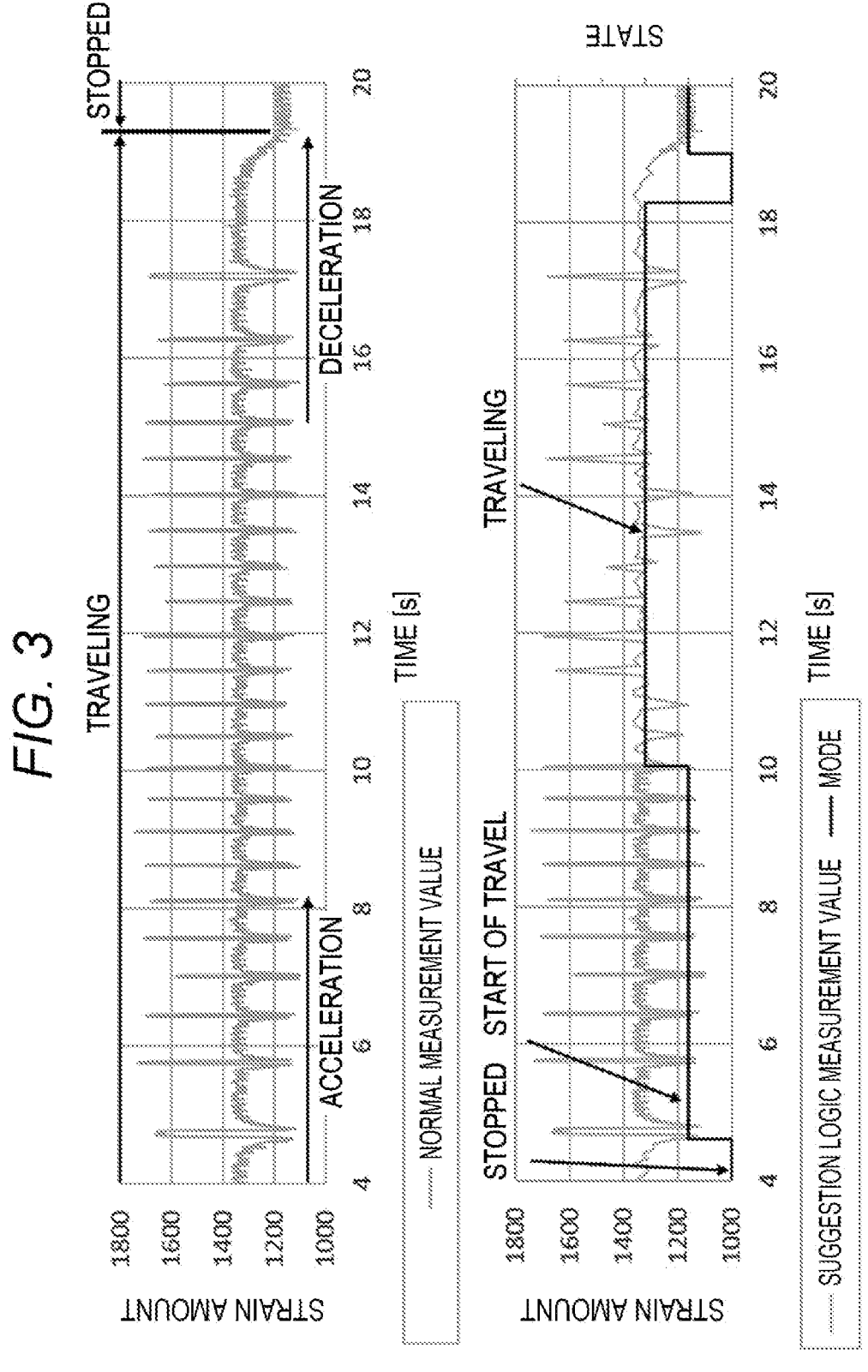
FIG. 3 is a graph exemplifying a change with time of a measurement signal output from a strain measuring element 11.

FIG. 3 is a graph exemplifying a change with time of a measurement signal output from the strain measuring element 11. The upper part in FIG. 3 is a waveform of a measurement signal transmitted from a conventional strain amount measurement device to the outside. The lower part in FIG. 3 is a waveform of a measurement signal transmitted from the strain amount detecting device 1 in the present embodiment to the outside of the device (that is, the sampling rate is adjusted). In the conventional strain amount measurement device, the measurement signal is acquired with substantially the same frequency and transmitted to the outside of the device regardless of whether a vehicle is starting, traveling, or stopping. Therefore, power consumption is large, whereby it is difficult to secure the operating time of the strain amount measurement device. In the present embodiment, the operation state of a vehicle is determined as follows, and the sampling mode is changed according to the operation state. As a result, power consumption can be reduced.

When the vehicle changes from a stopped state to a starting state, a measurement signal rises. The signal processing unit 12 obtains the time average of the measurement signal, and determines that the vehicle has transitioned to the starting state (the traveling start state in FIG. 3) at a point of time when the difference between the time average and the latest value exceeds a threshold value. As illustrated in the waveform in the period of time of the starting state in FIG. 3, a time rate of change in measurement signal is large (a rising peak occurs a plurality of times) in the starting state. Therefore, the high-speed sampling mode is set during this period of time.

When the vehicle is in a starting state, a rising peak of the measurement signal occurs a plurality of times. At a point of time when the occurrence of this peak reaches a specified number of times, it is determined that the vehicle has transitioned to a traveling state. The low-speed sampling mode is set in the traveling state. Therefore, during the period of time of the traveling state in FIG. 3, the frequency of the occurrence of the peak in the waveform is less than that in the starting state.

Figure 4:
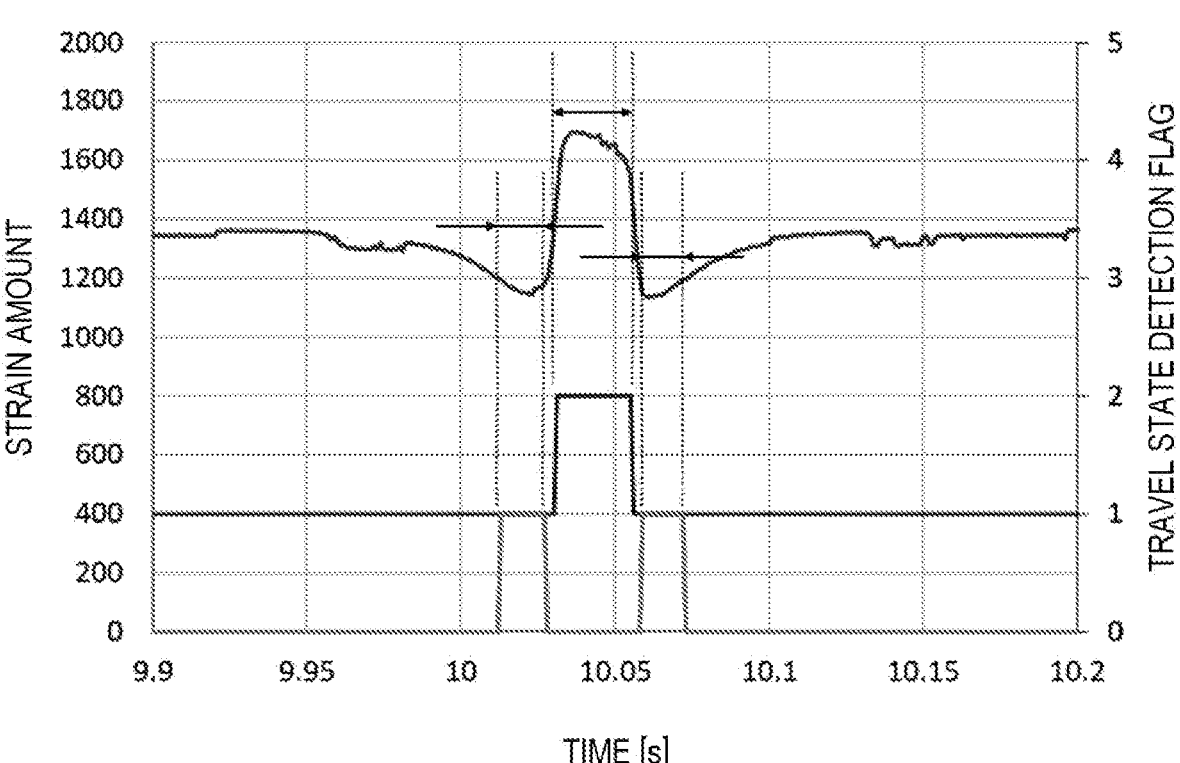
FIG. 4 is an example of a peak waveform of a measurement signal extracted by a feature extraction unit 125 in a starting state.

FIG. 4 is an example of a peak waveform of a measurement signal extracted by the feature extraction unit 125 in a starting state. The measurement signal has inverse peaks that slightly fall before and after a rising peak. The feature extraction unit 125 extracts the occurrence of the peak waveform as a feature amount when continuously detecting these three peaks in this order.

Specifically, the feature extraction unit 125 performs the following: (a) when the difference between the time average value of the measurement signal and the latest value (or the ratio of the latest value with respect to the time average value, the same applies hereinafter) becomes greater than or equal to an upper threshold value, it is regarded as a rising peak; (b) when the difference between the time average value of the measurement signal and the latest value becomes less than or equal to a lower threshold value, it is regarded as a falling peak; (c) when a falling peak, a rising peak, and then a falling peak again have continuously occurred in this order, it is determined as the occurrence of a peak waveform. In FIG. 4, a flag indicating detection of a rising peak and flags indicating detection of falling peaks are illustrated together with the waveform of the measurement signal.

The degree of the value of the signal when the measurement signal is in a steady state (a stable state with little change with time) depends on the operational environment. Therefore, it is difficult to define a judgement threshold value for detecting a peak by an absolute value. In view of the above, in the present embodiment, a value of the measurement signal in the steady state is obtained by time averaging, and a peak waveform is detected according to the degree of deviation of the latest value from the time average. Therefore, the upper threshold value and the lower threshold value described above can be defined as follows, for example: if the latest value is 1.1 times or more the time average, it is regarded as a rising peak; if the latest value is 0.9 times or less the time average, it is regarded as a falling peak. These numerical values are examples.

The above-described method for detecting the peak waveform is similarly used both in high-speed sampling data and low-speed sampling data. Therefore, whether or not the high-speed sampling data has a peak waveform is determined by using a calculation result by the high-speed sampling average value calculation unit 124, and whether or not the low-speed sampling data has a peak waveform is determined by using a calculation result by the low-speed sampling average value calculation unit 123.

First Embodiment: Summary

The strain amount detecting device 1 according to the first embodiment judges the operation state of a vehicle according to a measurement signal output from the strain measuring element 11, samples the measurement signal at a low sampling rate when the vehicle is in a stopped state, and samples the measurement signal at a high sampling rate when the vehicle is in a transitional state in which the vehicle transitions from the stopped state to the traveling state. As a result, since the sampling rate is increased only when there is a high need to frequently acquire the measurement signal, power consumption can be reduced. Furthermore, since the operation state of the vehicle is determined by using a strain measurement signal, the strain amount detecting device 1 is capable of reducing power consumption by itself without relying on a function other than the strain amount detecting device 1, such as an external sensor.

The strain amount detecting device 1 according to the first embodiment stores the measurement signal in the low-speed sampling buffer 121 at timings overlapping with sampling timings in the low-speed sampling mode, during the high-speed sampling mode. As a result, for example, the feature extraction unit 125 and the state determination unit 126 can use the same determination criterion (the measurement signal acquired under the same criterion) both when determining whether or not the state has transitioned from the traveling start state to the stopped state and when determining whether or not the state has transitioned from the traveling state to the stopped state.

The strain amount detecting device 1 according to the first embodiment uses the low-speed sampling rate in the traveling state. As a result, power consumption can be reduced while accurately determining the abnormality of the tire using the high-speed sampling rate during starting of the vehicle.

Second Embodiment

In the first embodiment, it has been described that it is determined that the vehicle has transitioned to the traveling state at a point of time when the peak waveform of the measurement signal is detected a specified number of times during a period of time determined by the state determination unit 126 to be the vehicle having started traveling. For example, FIG. 3 illustrates an example in which the state transitions to the traveling state at a point of time when ten peak waveforms are detected during the traveling start period of time. Instead of detecting the peak waveform a specified number of times, it may be determined that the state has transitioned to the traveling state by the peak waveform continuously appearing for a predetermined time or more.

The state determination unit 126 can make a determination as follows, for example. In a case in which the time without the peak waveform appearing reaches a specified time or more in the traveling start state, it is determined that the state has transitioned to the stopped state. Otherwise, the peak waveform is considered to be continuous. In other words, if the time without the peak waveform appearing does not reach a specified time or more, it is determined that the state has transitioned to the traveling state. This corresponds to detecting that the tire continues to rotate for a certain amount of time or more.

Modifications of the Present Invention

The present invention is not limited to the above embodiments, and includes various modifications. For example, the above embodiments have been described in detail in order to describe the present invention in an easy-to-understand manner, and are not necessarily limited to those having all the described configurations. Further, a part of the configuration of one embodiment can be replaced with the configuration of another embodiment, and the configuration of another embodiment can be added to the configuration of one embodiment. Further, it is possible to add, delete, and replace other configurations for a part of the configuration of each embodiment.

In the above embodiments, the sampling rate in the stopped state and the sampling rate in the traveling state may not be necessarily the same. For example, a low sampling rate may be used in the stopping state, a medium sampling rate (intermediate sampling rate between the low-speed sampling and the high-speed sampling) may be used in the traveling state, and a high sampling rate may be used in the traveling start state. In this case, a sampling buffer and an average value calculation unit may each be newly provided corresponding to the medium sampling rate.

In the above embodiments, the signal processing unit 12 and each functional unit included in the signal processing unit 12 can include hardware such as a circuit device that implements the function, or be configured such that a calculation device such as a processor executes software that implements the function.

In the above embodiments, an example has been described in which strain of a tire is detected by mounting the strain amount detecting device 1 on the tire, but the present invention can also be applied to a case in which strain of an object other than a tire is detected. That is, the present invention is useful in an aspect in which the strain amount detecting device 1 determines the operation state of an object to which the strain amount detecting device 1 is attached and adjusts the sampling frequency according to the operation state.

REFERENCE SIGNS LIST

1 strain amount detecting device
11 strain measuring element
12 signal processing unit
121 low-speed sampling buffer
122 high-speed sampling buffer
123 low-speed sampling average value calculation unit
124 high-speed sampling average value calculation unit
125 feature extraction unit
126 state determination unit
127 strain amount calculation unit
13 transmission unit

The invention claimed is:
1. A strain amount detecting device for reducing power consumption, is attached to an object, and comprises:
   a strain measuring element that detects a strain of the object and converts the strain into an electrical signal and outputs the electrical signal as a measurement signal;
   a signal processing unit that processes the measurement signal at a plurality of different sampling rates; and
   a transmission unit that transmits a result of processing by the signal processing unit, wherein
   the signal processing unit includes:
      a feature extraction unit that extracts a feature amount of a change with time of the measurement signal,
      a state determination unit that determines an operation state of the object according to the feature amount, and the operation state includes a stopped state or a moving state, and when transitioning between the stopped state and moving state is in a transition, and
      a strain amount calculation unit that computes a strain amount by using the measurement signal,
   the feature extraction unit extracts, as the feature amount, a first change with time in which a difference between an average value of the measurement signal over a predetermined time and a latest value is greater than or equal to a first threshold value during a period of time when the object is determined by the state determination unit to be in the stopped state,
   the feature extraction unit extracts, as the feature amount, a second change with time in which after the latest value of the measurement signal becomes greater than or equal to a second threshold value, the latest value becomes less than or equal to a third threshold value that is smaller than the second threshold value during a period of time when the object is determined by the state determination unit to be in the transition,
   the state determination unit determines that the object is in the transition when the feature extraction unit extracts the first change with time during a period of time when the object is determined by the state determination unit to be in the stopped state,

the state determination unit determines that the object has transitioned to the moving state when the feature extraction unit continuously extracts the second change with time a predetermined number of times or over a predetermined time during a period of time when the object is determined by the state determination unit to be in the transition,
   during a period of time determined by the state determination unit to be the object being in the stopped state, the signal processing unit is set to a first sampling rate and the strain amount calculation unit, at the first sampling rate, acquires the measurement signal and computes the strain amount, and
   during a period of time determined by the state determination unit to be the object being in the transition, the signal processing unit changes from the first sampling rate to a second sampling rate that is higher in frequency than the first sampling rate and the strain amount calculation unit, at the second sampling rate, acquires the measurement signal and computes the strain amount.
2. The strain amount detecting device according to claim 1, wherein
   the signal processing unit further includes:
      a first sampling buffer that stores the measurement signal for each first sampling rate; and
      a second sampling buffer that stores the measurement signal for each second sampling rate, and
      the first sampling buffer stores, during a period of time in which the strain amount computation unit acquires the measurement signal at the second sampling rate, the measurement signal at a timing overlapping with a sampling timing of the first sampling rate among sampling timings of the second sampling rate.
3. The strain amount detecting device according to claim 1, wherein
   the signal processing unit further includes:
      a first sampling average value calculation unit that computes an average value of the measurement signal for each first sampling rate; and
      a second sampling average value calculation unit that computes the average value of the measurement signal for each second sampling rate, wherein
      the first sampling average value calculation unit calculates, during a period of time in which the strain amount computation unit acquires the measurement signal at the second sampling rate, the average value of the measurement signal at a timing overlapping with a sampling timing of the first sampling rate among sampling timings of the second sampling rate, and
   the feature extraction unit extracts the feature amount by using the average value of the measurement signal.
4. The strain amount detecting device according to claim 1, wherein
   the feature extraction unit extracts, as the feature amount, the second change with time during a period of time determined by the state determination unit to be the object being in the moving state or in the transition, and
   the state determination unit determines that the object is in the stopped state when the strain amount detecting device is powered on, when the feature extraction unit does not extract the second change with time within a predetermined time in the transition, or when the feature extraction unit does not extract the second change with time within a predetermined time in the moving state.

5. The strain amount detecting device according to claim 1, wherein the signal processing unit further includes:

a first sampling buffer that stores the measurement signal for each first sampling rate; and a second sampling buffer that stores the measurement signal for each second sampling rate, wherein the feature extraction unit extracts the feature amount by using the measurement signal stored in the first sampling buffer during a period of time determined by the state determination unit to be the object being in the moving state, the feature extraction unit extracts the feature amount by using the measurement signal stored in the first sampling buffer and extracts the feature amount by using the measurement signal stored in the second sampling buffer during a period of time determined by the state determination unit to be the object being in the transition, the state determination unit uses the feature amount extracted by using the measurement signal stored in the first sampling buffer when determining whether or not the object has transitioned to the stopped state, the state determination unit uses the feature amount extracted by using the measurement signal stored in the first sampling buffer when determining whether or not the object has transitioned from the moving state to the stopped state, and the state determination unit uses the feature amount extracted by using the measurement signal stored in the second sampling buffer when determining whether or not the object has transitioned to the moving state.

6. The strain amount detecting device according to claim 1, wherein the strain amount calculation unit acquires the measurement signal at a third sampling rate higher in frequency than the first sampling rate and lower in frequency than the second sampling rate and computes the strain amount during a period of time determined by the state determination unit to be the object being in the moving state.

7. The strain amount detecting device according to claim 1, wherein the object is a tire included in a vehicle on which the strain amount detecting device is mounted, the stopped state is a state in which the vehicle is stopped, whereby the tire is also stopped, and the moving state is a state in which the vehicle is traveling.

\* \* \* \* \*